US012745290B2

(12) United States Patent
Abotabl et al.

(10) Patent No.: US 12,745,290 B2
(45) Date of Patent: Sep. 22, 2026

(54) VALID RANDOM ACCESS CHANNEL OCCASIONS IN SUB-BAND FULL DUPLEX

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 325 days.

(21) Appl. No.: 18/536,071

(22) Filed: Dec. 11, 2023

(65) Prior Publication Data

US 2025/0193937 A1 Jun. 12, 2025

(51) Int. Cl.
*H04W 74/08* (2024.01)
*H04W 74/0836* (2024.01)
*H04W 72/044* (2023.01)

(52) U.S. Cl.
CPC ...... *H04W 74/0836* (2024.01); *H04W 72/044* (2013.01)

(58) Field of Classification Search
CPC ........... H04W 74/0836; H04W 72/044; H04W 74/0833; H04W 74/006; H04W 72/0446; H04W 74/0841; H04W 74/02; H04W 74/841; H04W 72/1263
See application file for complete search history.

(56) References Cited

U.S. PATENT DOCUMENTS

2023/0276438 A1* 8/2023 Rudolf ................ H04W 52/146
2025/0133563 A1* 4/2025 Choi ..................... H04L 5/0094
2025/0158791 A1* 5/2025 Zhang ............... H04W 72/0446
2025/0240131 A1* 7/2025 Ly ......................... H04L 5/0094
2025/0254007 A1* 8/2025 Chen ..................... H04L 5/0057
2025/0261246 A1* 8/2025 Choi ................. H04W 74/0833
2025/0267726 A1* 8/2025 Abdelghaffar .... H04W 74/0833

FOREIGN PATENT DOCUMENTS

WO WO-2024035329 A1 * 2/2024 ........ H04W 74/0833

* cited by examiner

*Primary Examiner* — Mewale A Ambaye
(74) *Attorney, Agent, or Firm* — Harrity & Harrity, LLP

(57) ABSTRACT

Various aspects of the present disclosure generally relate to wireless communication. In some aspects, a user equipment (UE) may receive a sub-band configuration indicating that a time resource is configured to include an uplink sub-band and at least one of a downlink sub-band or a flexible sub-band. The UE may transmit a random access channel (RACH) message on a RACH occasion (RO), wherein the RO is associated with a valid status in association with whether the RO is configured in the uplink sub-band. Numerous other aspects are described.

30 Claims, 14 Drawing Sheets

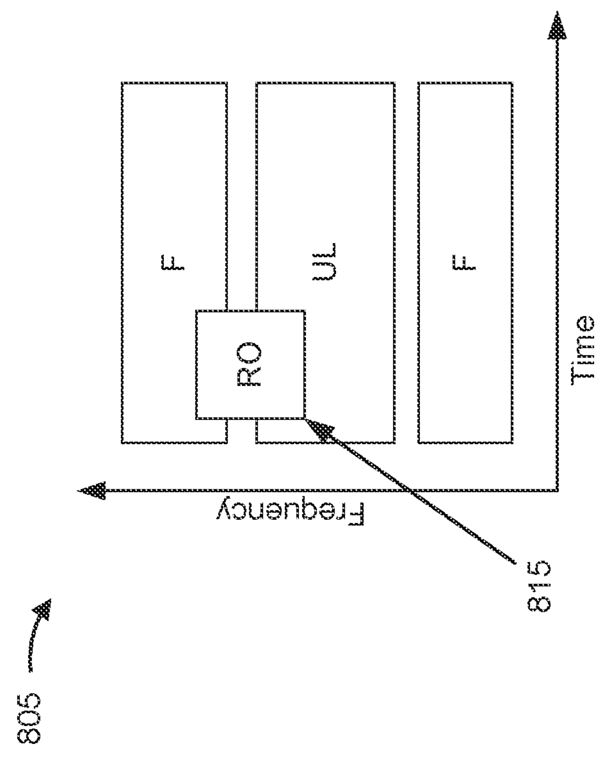
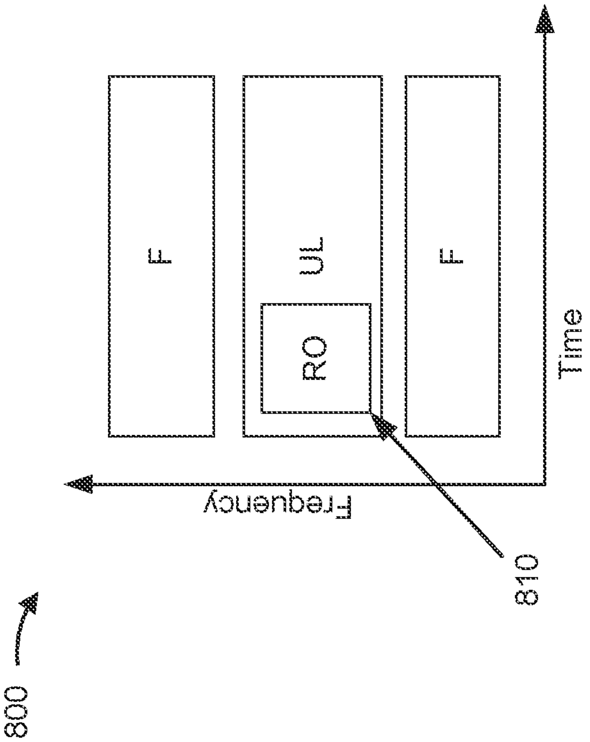
FIG. 8

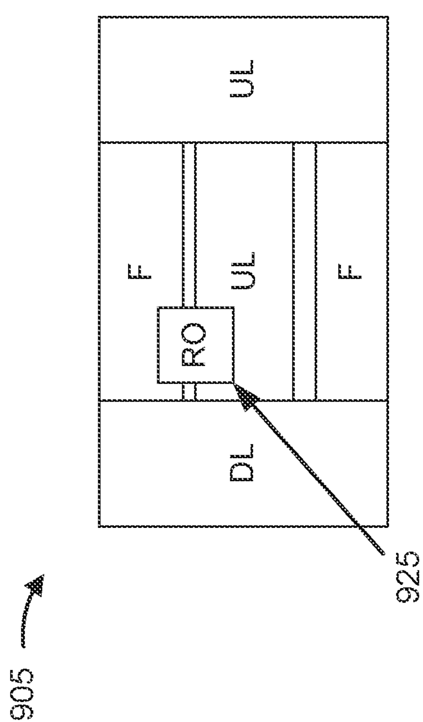
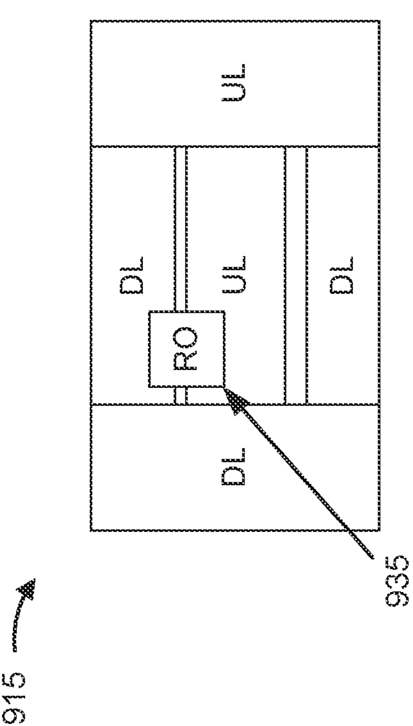
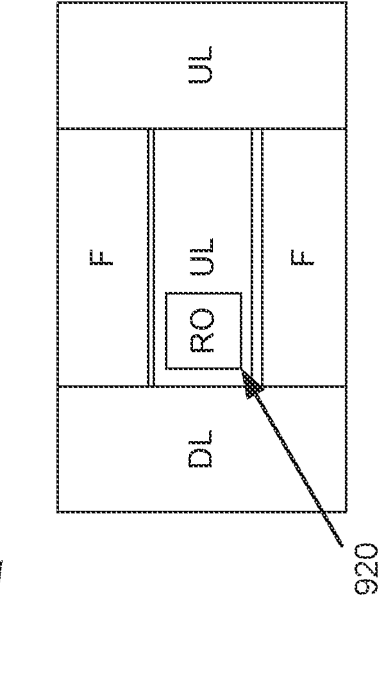
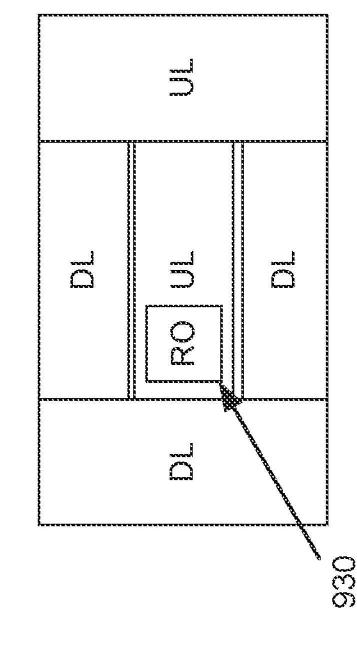
FIG. 9

1100
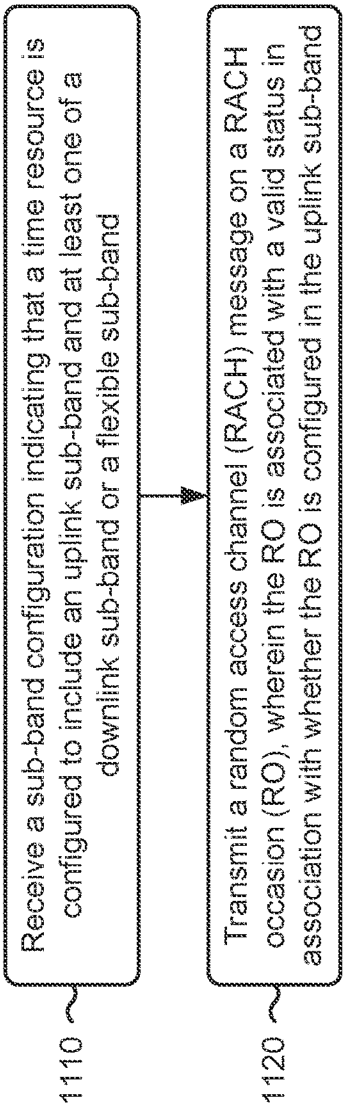
FIG. 11

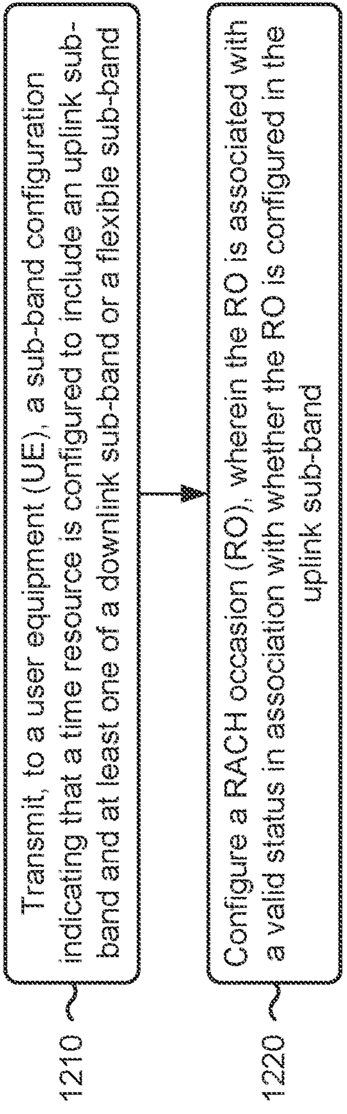
1200

VALID RANDOM ACCESS CHANNEL OCCASIONS IN SUB-BAND FULL DUPLEX

FIELD OF THE DISCLOSURE

Aspects of the present disclosure generally relate to wireless communication and specifically relate to techniques, apparatuses, and methods for valid random access channel occasions in sub-band full duplex.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

In some aspects, a method of wireless communication performed by a user equipment (UE) includes receiving a sub-band configuration indicating that a time resource is configured to include an uplink sub-band and at least one of a downlink sub-band or a flexible sub-band; and transmitting a random access channel (RACH) message on a RACH occasion (RO), wherein the RO is associated with a valid status in association with whether the RO is configured in the uplink sub-band.

In some aspects, an apparatus for wireless communication at a UE includes one or more memories; and one or more processors, coupled to the one or more memories, configured to cause the UE to: receive a sub-band configuration indicating that a time resource is configured to include an uplink sub-band and at least one of a downlink sub-band or a flexible sub-band; and transmit a RACH message on a RO, wherein the RO is associated with a valid status in association with whether the RO is configured in the uplink sub-band.

In some aspects, a non-transitory computer-readable medium storing a set of instructions for wireless communication includes one or more instructions that, when executed by one or more processors of a UE, cause the UE to: receive a sub-band configuration indicating that a time resource is configured to include an uplink sub-band and at least one of a downlink sub-band or a flexible sub-band; and transmit a RACH message on a RO, wherein the RO is associated with a valid status in association with whether the RO is configured in the uplink sub-band.

In some aspects, an apparatus for wireless communication includes means for receiving a sub-band configuration indicating that a time resource is configured to include an uplink sub-band and at least one of a downlink sub-band or a flexible sub-band; and means for transmitting a RACH message on a RO, wherein the RO is associated with a valid status in association with whether the RO is configured in the uplink sub-band.

In some aspects, a method of wireless communication performed by a network node includes transmitting, to a UE, a sub-band configuration indicating that a time resource is configured to include an uplink sub-band and at least one of a downlink sub-band or a flexible sub-band; and configuring a RO, wherein the RO is associated with a valid status in association with whether the RO is configured in the uplink sub-band.

In some aspects, an apparatus for wireless communication at a network node includes one or more memories; and one or more processors, coupled to the one or more memories, configured to cause the network node to: transmit, to a UE, a sub-band configuration indicating that a time resource is configured to include an uplink sub-band and at least one of a downlink sub-band or a flexible sub-band; and configure a RO, wherein the RO is associated with a valid status in association with whether the RO is configured in the uplink sub-band.

In some aspects, a non-transitory computer-readable medium storing a set of instructions for wireless communication includes one or more instructions that, when executed by one or more processors of a network node, cause the network node to: transmit, to a UE, a sub-band configuration indicating that a time resource is configured to include an uplink sub-band and at least one of a downlink sub-band or a flexible sub-band; and configure a RO, wherein the RO is associated with a valid status in association with whether the RO is configured in the uplink sub-band.

In some aspects, an apparatus for wireless communication includes means for transmitting, to a UE, a sub-band configuration indicating that a time resource is configured to include an uplink sub-band and at least one of a downlink sub-band or a flexible sub-band; and means for configuring a RO, wherein the RO is associated with a valid status in association with whether the RO is configured in the uplink sub-band.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIGS. 8-10 are diagrams illustrating examples of ROs in SBFD resources, in accordance with the present disclosure.

FIG. 11 is a diagram illustrating an example process performed, for example, at a UE or an apparatus of a UE, in accordance with the present disclosure.

FIG. 12 is a diagram illustrating an example process performed, for example, at a network node or an apparatus of a network node, in accordance with the present disclosure.

DETAILED DESCRIPTION

Figure 1:
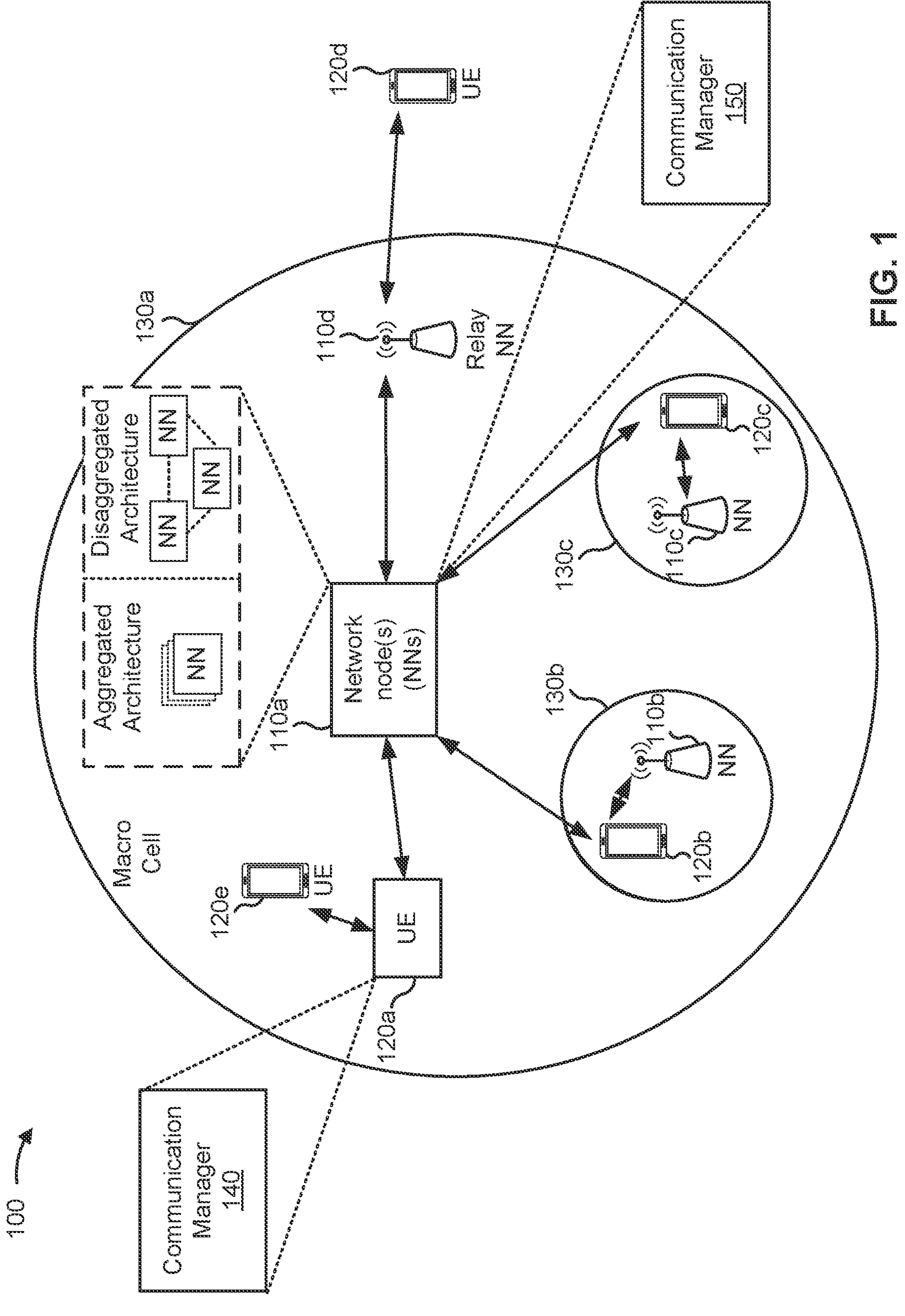
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A user equipment (UE) may use a random access procedure for various purposes, such as initial access, synchronization, and recovery from a link failure. A random access procedure involves the transmission of a physical random access (PRACH) message, which carries a PRACH preamble selected by the UE, on a random access channel (RACH) occasion (RO). An RO is a configured resource (such as via system information or radio resource control (RRC) signaling) that is designated for PRACH preamble transmission, such that a network node can monitor an appropriate resource for the PRACH preamble and/or identify the transmitting UE based at least in part on the RACH occasion and/or the PRACH preamble. One or more RACH occasions may be mapped to a synchronization signal block (SSB). The SSB may be associated with a number of PRACH preambles. Some PRACH messages may include both a PRACH preamble and a physical uplink shared channel (PUSCH), such as for two-step RACH procedures. The PUSCH may be transmitted on a PUSCH occasion, which may be derived from the corresponding RO of the PRACH preamble.

A UE or a network node may be configured for full-duplex operation (sometimes referred to as a full-duplex mode) or half-duplex operation (sometimes referred to as a half-duplex mode). A network node or UE operating in a half-duplex mode may perform only one of transmission or reception during particular time resources, such as during particular slots, symbols, or other time periods. Half-duplex operation may involve time-division duplexing (TDD), in which downlink transmissions of the network node and uplink transmissions of the UE do not occur in the same time resources (that is, the transmissions do not overlap in time). In contrast, a network node or a UE operating in a full-duplex mode can transmit and receive communications concurrently (for example, in the same time resources). By operating in a full-duplex mode, network nodes and/or UEs may generally increase the capacity of the network and the radio access link. In some examples, full-duplex operation may involve frequency-division duplexing (FDD), in which downlink transmissions of the network node are performed in a first frequency band or on a first component carrier and transmissions of the UE are performed in a second frequency band or on a second component carrier different than the first frequency band or the first component carrier, respectively. One example of full-duplex operation is sub-band full duplex, in which a carrier or communicating bandwidth is divided into one or more uplink sub-bands and one or more downlink sub-bands (e.g., separated by a guard band).

Some ROs may be considered valid ROs, whereas other ROs may be considered invalid ROs. A valid RO may be usable for PRACH preamble transmission, and the network may avoid configuring or scheduling other communications on a valid RO. SSBs and RACH preambles may be mapped to valid ROs (and in some examples not to invalid ROs). In half-duplex FDD spectrum (i.e., paired spectrum), all ROs may be considered valid. In half-duplex TDD spectrum (i.e., unpaired spectrum), the validity of an RO may be based on whether a common uplink/downlink configuration has been configured and whether the RO occurs in an uplink resource. However, the validity of ROs in SBFD resources may be unclear, since an SBFD resource may include both uplink resources and downlink resources. Without clarity on whether ROs in SBFD resources are valid, a network node may configure communications overlapping a valid RO, or RACH efficiency may be decreased.

Aspects of the present disclosure relate generally to PRACH configuration. Some aspects more specifically relate to determination of valid ROs in SBFD resources. In some aspects, a UE is configured with an SBFD resource (including an uplink sub-band and at least one of a downlink sub-band or a flexible sub-band). The UE may transmit a RACH message on a valid RO. The valid RO may be associated with a valid status in association with whether the RO is configured in the uplink sub-band. For example, in some aspects, ROs occurring outside the uplink sub-band (e.g., in a flexible sub-band) may be considered invalid. As another example, ROs occurring in a flexible sub-band may be considered valid if the UE has been indicated to transmit outside of the uplink sub-band. In some aspects, multiple ROs may overlap one another in time, and one or more of these ROs may occur outside the uplink sub-band. In some aspects, all of the multiple ROs may be invalid if any RO occurs outside the uplink sub-band (and the UE is not allowed to transmit outside the uplink sub-band). In some other aspects, only the RO(s) occurring outside the uplink sub-band may be invalid.

Aspects of the present disclosure may be used to realize one or more of the following potential advantages. In some aspects, by identifying valid ROs in association with whether the RO is configured in the uplink sub-band, the validity of ROs in SBFD resources is clarified, thereby avoiding conflict between ROs and other forms of communications and enabling RO configuration in SBFD resources. In some aspects, by invalidating all time-overlapped ROs if any RO of the time-overlapped ROs occurs outside the uplink sub-band, network energy savings are increased. By invalidating only ROs occurring outside the uplink sub-band, a larger number of valid ROs are preserved compared to invalidating all ROs, thereby improving RACH efficiency.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, XR and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as RRC functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, PRACH extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more PUSCHs. The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, eMBB, and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve TDD, in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve FDD, in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may receive a sub-band configuration indicating that a time resource is configured to include an uplink sub-band and at least one of a downlink sub-band or a flexible sub-band; and transmit a RACH message on a RO, wherein the RO is associated with a valid status in association with whether the RO is configured in the uplink sub-band. Additionally, or alternatively, the communication manager 140 may perform one or more other operations described herein.

In some aspects, the network node 110 may include a communication manager 150. As described in more detail elsewhere herein, the communication manager 150 may transmit, to a UE, a sub-band configuration indicating that a time resource is configured to include an uplink sub-band and at least one of a downlink sub-band or a flexible sub-band; and configure a RO, wherein the RO is associated with a valid status in association with whether the RO is configured in the uplink sub-band. Additionally, or alternatively, the communication manager 140 may perform one or more other operations described herein.

As indicated above, FIG. 1 is provided as an example. Other examples may differ from what is described with regard to FIG. 1.

Figure 2:
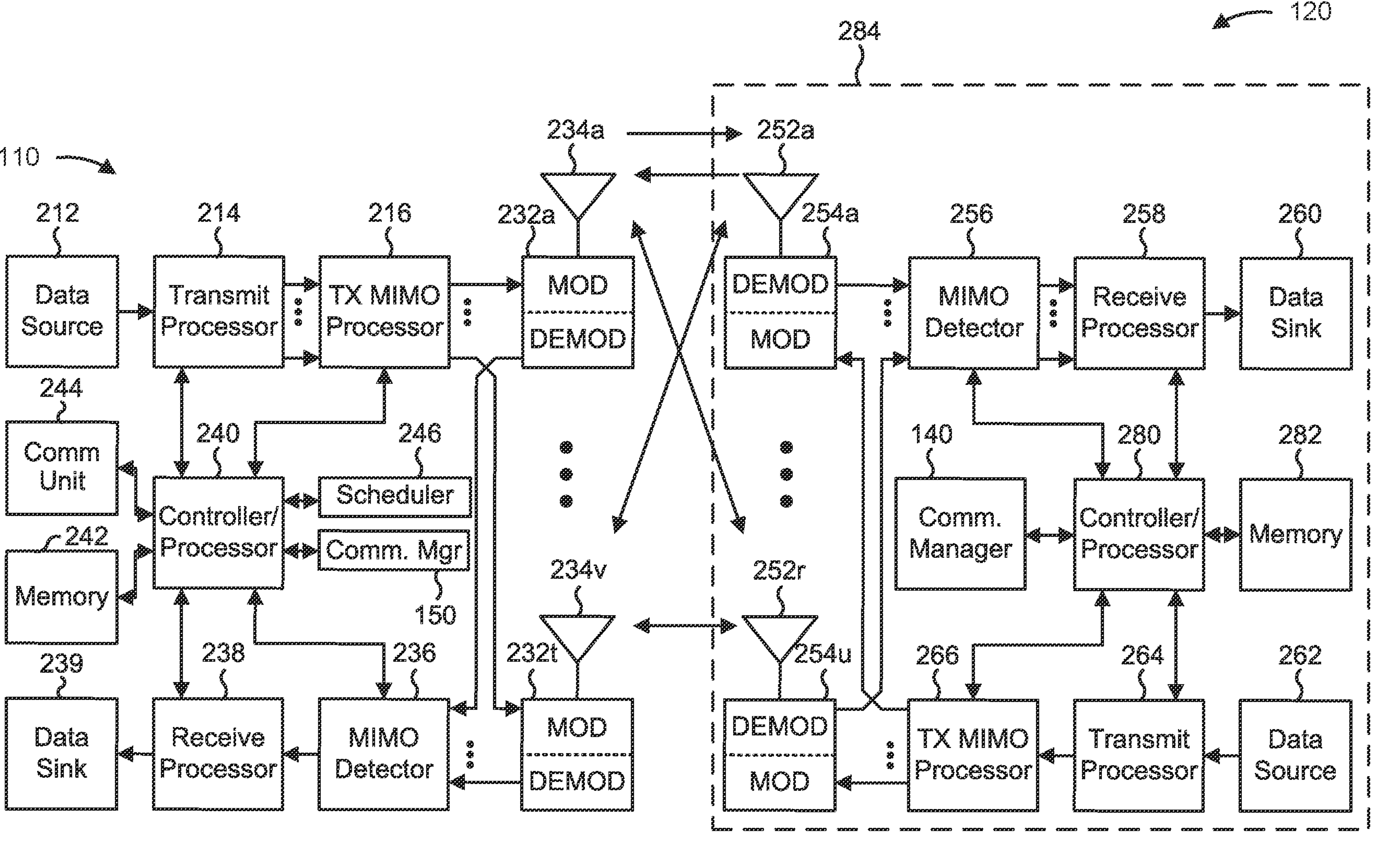
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal, and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
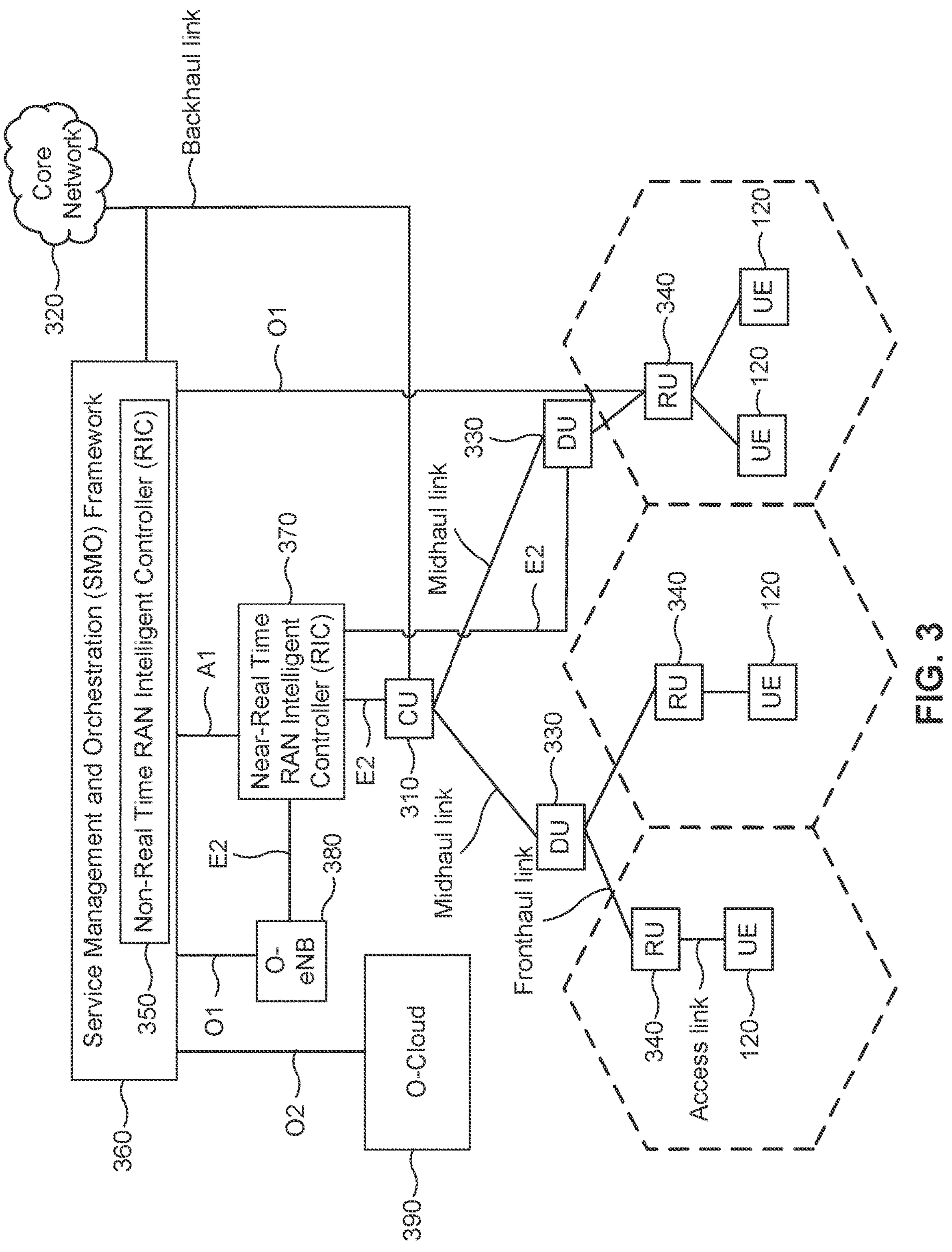
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with RACH occasion configuration, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 1100 of FIG. 11, process 1200 of FIG. 12, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 1100 of FIG. 11, process 1200 of FIG. 12, or other processes as described herein. In some examples, executing instructions may include running the instructions, converting the instructions, compiling the instructions, and/or interpreting the instructions, among other examples.

In some aspects, the UE includes means for receiving a sub-band configuration indicating that a time resource is configured to include an uplink sub-band and at least one of a downlink sub-band or a flexible sub-band; and/or means for transmitting an RACH message on an RO, wherein the RO is associated with a valid status in association with whether the RO is configured in the uplink sub-band. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting, to a UE, a sub-band configuration indicating that a time resource is configured to include an uplink sub-band and at least one of a downlink sub-band or a flexible sub-band; and/or means for configuring an RO, wherein the RO is associated with a valid status in association with whether the RO is configured in the uplink sub-band. The means for the network node to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

Figure 4:
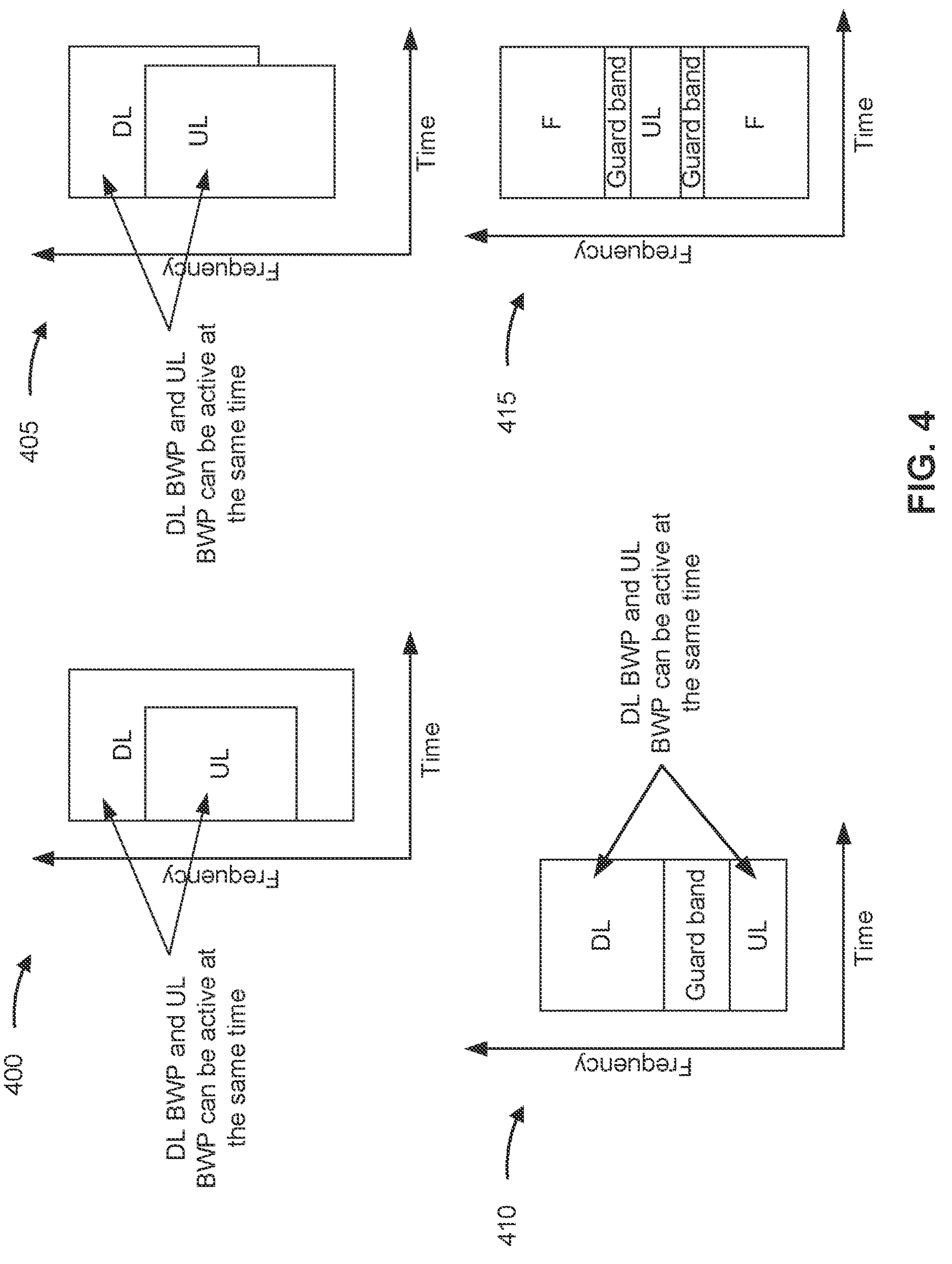
FIG. 4 is a diagram illustrating examples of full-duplex communication in a wireless network, in accordance with the present disclosure.

FIG. 4 is a diagram illustrating examples 400, 405, and 410 of full-duplex communication in a wireless network, in accordance with the present disclosure. "Full-duplex communication" in a wireless network refers to simultaneous bi-directional communication between devices in the wireless network. For example, a UE operating in a full-duplex mode may transmit an uplink communication and receive a downlink communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol).

As shown in FIG. 4, examples 400 and 405 show examples of in-band full-duplex (IBFD) communication. In IBFD, a UE may transmit an uplink communication to a base station and receive a downlink communication from the base station on the same time and frequency resources. As shown in example 400, in a first example of IBFD, the time and frequency resources for uplink communication may fully overlap with the time and frequency resources for downlink communication. As shown in example 405, in a second example of IBFD, the time and frequency resources for uplink communication may partially overlap with the time and frequency resources for downlink communication.

As further shown in FIG. 4, example 410 shows an example of sub-band full-duplex (SBFD) communication, which may also be referred to as "sub-band frequency division duplex (SBFDD)" or "flexible duplex." In SBFD, a UE may transmit an uplink communication to a base station and receive a downlink communication from the base station at the same time, but on different frequency resources. For example, the different frequency resources may be sub-bands of a frequency band, such as a time division duplexing band. In this case, the frequency resources used for downlink communication (e.g., downlink sub-bands) may be separated from the frequency resources used for uplink communication (e.g., uplink sub-bands), in the frequency domain, by a guard band. Example 415 is another example of SBFD communication. Example 415 includes an uplink sub-band and two flexible sub-bands. A UE can be indicated to communicate outside of the uplink sub-band, such as by utilizing the flexible sub-bands.

A UE may be configured for SBFD by a sub-band configuration. For example, the sub-band configuration may include a downlink/uplink (DL/UL) sub-band configuration. The sub-band configuration may indicate one or more uplink sub-bands, one or more downlink sub-bands, one or more flexible sub-bands, one or more guard bands, or a combination thereof. The sub-band configuration may apply to one or more time resources, such as a slot, a group of slots, or the like. Additionally, or alternatively, the sub-band configuration may apply to a carrier, a bandwidth part, or the like.

As indicated above, FIG. 4 is provided as an example. Other examples may differ from what is described with respect to FIG. 4.

Figure 5:
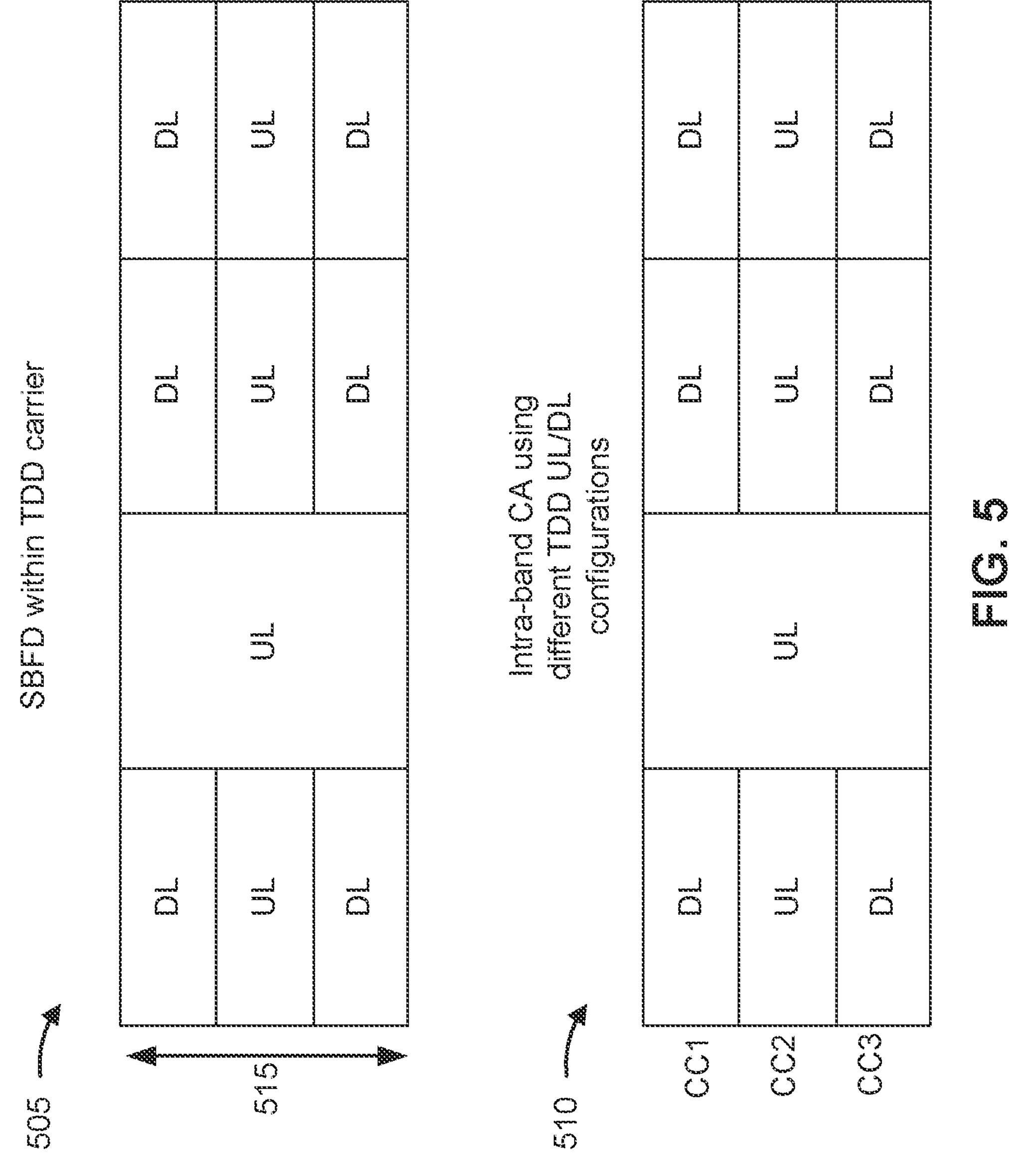
FIG. 5 is a diagram illustrating an example of sub-band full-duplex (SBFD) schemes, in accordance with the present disclosure.

FIG. 5 is a diagram illustrating an example 500 of SBFD schemes, in accordance with the present disclosure. Example 500 illustrates a first SBFD scheme 505 and a second SBFD scheme 510. The first SBFD scheme 505 provides SBFD within a TDD carrier, in which a single CC 515's bandwidth is divided into non-overlapping UL and DL subbands. The second SBFD scheme 510 provides SBFD across multiple carriers (for example, intra-band carrier aggregation (CA)) using different TDD configurations. For example, CC1 and CC3 may have the same TDD configuration (e.g., DUDD, indicating a first slot is a DL slot, a second slot is a UL slot, and a third slot and a fourth slot are DL slots) and CC2 may be configured as an uplink carrier.

A TDD configuration may include a cell-common TDD configuration or a dedicated TDD configuration. A TDD configuration may be semi-statically configured via RRC signaling. A cell-common TDD configuration may be provided via an RRC parameter tdd-UL-DL-Configuration-Common, and may apply to all UEs associated with a cell. A dedicated TDD configuration may be provided via an RRC parameter tdd-UL-DL-ConfigurationDedicated and may apply to a UE to which the dedicated TDD configuration is directed. A resource can also be semi-statically configured as a flexible resource (e.g., having a flexible resource type), referred to herein as an RRC-F resource. After configuration as a semi-statically configured resource, a flexible resource (e.g., RRC-F), such as a symbol of a slot, can be subsequently indicated as an uplink resource (e.g., a resource having an uplink resource type), a downlink resource (e.g., a resource having a downlink resource type), or a flexible resource by a slot format indicator (SFI). An SFI includes an index into a table that identifies how each symbol number in a slot should be configured (e.g., as an uplink resource, a downlink resource, or a flexible resource). A flexible resource indicated by an SFI as an uplink resource (e.g., as having an uplink resource type) is referred to as an SFI-U resource. A flexible resource indicated by an SFI as a downlink resource (e.g., as having a downlink resource type) is referred to as an SFI-D resource. A flexible resource indicated by an SFI as a flexible resource is referred to as an SFI-F resource. An SFI-D resource (or more generally, a resource having a downlink resource type) may have a downlink link direction. An SFI-U resource (or more generally, a resource having an uplink resource type) may have an uplink link direction.

As indicated above, FIG. 5 is provided as an example. Other examples may differ from what is described with regard to FIG. 5.

Figure 6:
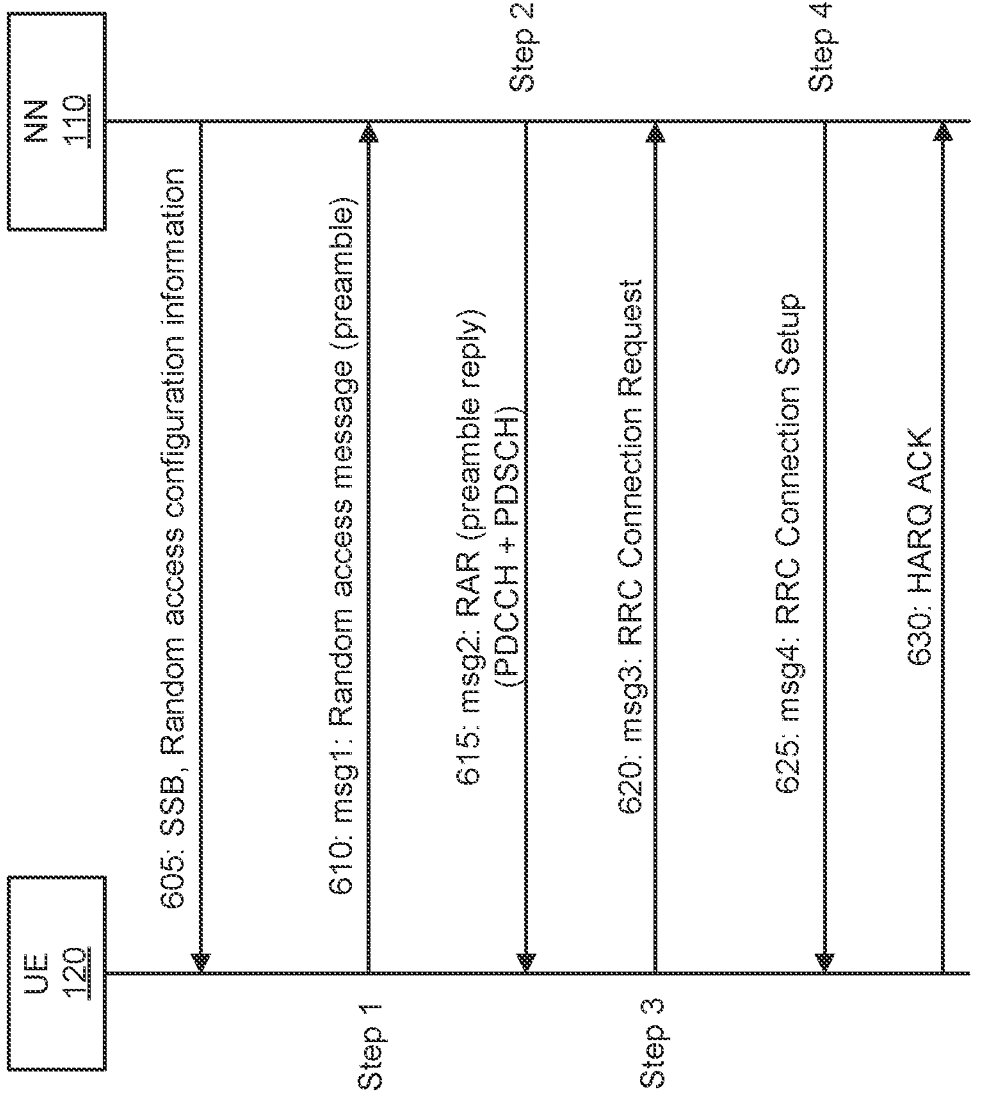
FIG. 6 is a diagram illustrating an example of a four-step random access procedure, in accordance with the present disclosure.

FIG. 6 is a diagram illustrating an example 600 of a four-step random access procedure, in accordance with the present disclosure. As shown in FIG. 6, a network node 110 and a UE 120 may communicate with one another to perform the four-step random access procedure.

As shown by reference number 605, the network node 110 may transmit, and the UE 120 may receive, one or more SSBs and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the random access procedure, such as one or more parameters for transmitting a RAM and/or one or more parameters for receiving a random access response (RAR).

As shown by reference number 610, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier.

As shown by reference number 615, the network node 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the network node 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the network node 110 may transmit the PDSCH communication for the RAR, as scheduled by the PDCCH communication. The RAR may be included in a MAC protocol data unit (PDU) of the PDSCH communication.

As shown by reference number 620, the UE 120 may transmit an RRC connection request message. The RRC connection request message may be referred to as message 3, msg3, MSG3, or a third message of a four-step random access procedure. In some aspects, the RRC connection request may include a UE identifier, UCI, and/or a PUSCH communication (e.g., an RRC connection request).

As shown by reference number 625, the network node 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 630, if the UE 120 successfully receives the RRC connection setup message, the UE 120 may transmit a hybrid automatic repeat request (HARQ) acknowledgment (ACK).

In some aspects, the UE 120 may perform a two-step random access procedure. In a two-step random access procedure, msg1 and msg3 may be consolidated into a single msgA (also referred to as message A or a first message of a two-step random access procedure) and msg2 and msg4 may be consolidated into a single msgB (also referred to as message B or a second message of a two-step random access procedure). A four-step random access procedure may be referred to as a Type-1 random access procedure, and a two-step random access procedure may be referred to as a Type-2 random access procedure.

For a type-1 random access procedure, a UE may be provided a number N of SS/PBCH block indexes associated with one RO and a number R of contention based preambles per SS/PBCH block index per valid RO by a configuration (ssb-perRACH-OccasionAndCB-PreamblesPerSSB). "SS/PBCH block" is used interchangeably with "SSB" herein. For a Type-1 random access procedure, or for a Type-2 random access procedure with separate configuration of ROs from the Type 1 random access procedure, if N<1, one SS/PBCH block index is mapped to 1/N consecutive valid ROs and R contention based preambles with consecutive indexes associated with the SS/PBCH block index per valid RO starting from preamble index 0. If N≥1, R contention based preambles with consecutive indexes associated with SS/PBCH block index n, 0≤n≤N−1, per valid RO start from preamble index $$n \cdot N_{preamble}^{total}/N \text{ where } N_{preamble}^{total}$$

is provided by totalNumberOfRA-Preambles for Type-1 random access procedure, or by msgA-TotalNumberOfRA-Preambles for Type-2 random access procedure with separate configuration of PRACH occasions from a Type 1 random access procedure, and is an integer multiple of N.

SS/PBCH block indexes provided by ssb-PositionsInBurst in SIB1 or in ServingCellConfigCommon may be mapped to valid ROs in the following order: first, in increasing order of preamble indexes within a single RO; second, in increasing order of frequency resource indexes for frequency multiplexed ROs; third, in increasing order of time resource indexes for time multiplexed ROs within a PRACH slot; and fourth, in increasing order of indexes for PRACH slots.

In a RACH configuration, a UE may be configured with a parameter (ssb-perRACH-OccasionAndCB-Preambles-PerSSB) that indicates a number of SSBs per RACH occasion, and that indicates a number of preambles per SSB. For example, a first value (e.g., "oneEighth") of the parameter may correspond to one SSB associated with 8 ROs, a second value (e.g., "oneFourth") of the parameter may correspond to one SSB associated with 4 ROs, and so on. A value n4 may correspond to 4 Contention Based preambles per SSB, a value n8 may correspond to 8 Contention Based preambles per SSB, and so on. The total number of contention based preambles in an RO is given by CB-preambles-per-SSB*max(1, SSB-per-rach-occasion).

SSBs may be mapped to ROs according to an association period and an association pattern. An association period, starting from frame 0, for mapping SS/PBCH block indexes to ROs is the smallest integer number in the set determined by the PRACH configuration period according to Table 1 such that $$N_{Tx}^{SSB}$$

SS/PBCH block indexes are mapped at least once to the ROs within the association period, where a UE obtains $$N_{Tx}^{SSB}$$

from the value of ssb-PositionsInBurst in SIB1 or in ServingCellConfigCommon. If, after an integer number of SS/PBCH block indexes to ROs mapping cycles within the association period, there is a set of ROs or PRACH preambles that are not mapped to $$N_{Tx}^{SSB}$$

SS/PBCH block indexes, no SS/PBCH block indexes are mapped to the set of ROs or PRACH preambles. An association pattern period includes one or more association periods and is determined so that a pattern between ROs and SS/PBCH block indexes repeats at most every 160 msec. PRACH occasions not associated with SS/PBCH block indexes after an integer number of association periods, if any, are not used for PRACH transmissions.

The UE 120 may transmit msg1 on a valid RO. Below is a definition of valid ROs for non-SBFD resources (e.g., resources that are not configured, within a carrier or band, with an uplink sub-band and at least one of a downlink sub-band or a flexible sub-band). For paired spectrum (e.g., FDD bands) or a supplementary uplink band, all ROs are valid. The remainder of this paragraph relates to unpaired spectrum such as TDD bands. In a first example, if a UE 120 is not provided tdd-UL-DL-ConfigurationCommon, an RO in a PRACH slot is valid if the RO does not precede an SSB in the PRACH slot and starts at least $N_{gap}$ symbols after a last SSB reception symbol, where $N_{gap}$ is provided in Table 2. Continuing the first example, if channelAccessMode="semiStatic" is provided, the RO is valid if the RO does not overlap with a set of consecutive symbols before the start of a next channel occupancy time where the UE does not transmit. In the first example, the candidate SS/PBCH block index of the SSB corresponds to the SS/PBCH block index provided by ssb-PositionsInBurst in SIB1 or in ServingCellConfigCommon. In a second example, if a UE is provided tdd-UL-DL-Configuration-Common, an RO in a PRACH slot is valid if the RO is within uplink symbols (as indicated by tdd-UL-DL-ConfigurationCommon). In a third example, if a UE is provided tdd-UL-DL-ConfigurationCommon, an RO in a PRACH slot is valid if the RO does not precede an SSB in the PRACH slot and starts at least $N_{gap}$ symbols after a last downlink symbol and at least $N_{gap}$ symbols after a last SS/PBCH block symbol, where $N_{gap}$ is provided in Table 2. Continuing the third example, if channelAccessMode="semiStatic" is provided, the RO in the PRACH slot is valid if the RO does not overlap with a set of consecutive symbols before the start of a next channel occupancy time where there shall not be any transmissions. The candidate SS/PBCH block index of the SSB may correspond to the SS/PBCH block index provided by ssb-PositionsInBurst in SIB1 or in ServingCell-ConfigCommon. For preamble format B4, $N_{gap}$=0.

TABLE 2

$N_{gap}$ values for preamble subcarrier spacing (SCS) μ

| Preamble SCS | $N_{gap}$ |
|---|---|
| 1.25 kHz or 5 kHz | 0 |
| 15 kHz or 30 kHz or 60 kHz or 120 kHz | 2 |
| 480 kHz | 8 |
| 960 kHz | 16 |

As mentioned, the first, second, and third examples described above are applicable for non-SBFD slots. However, an SBFD resource may include both uplink resources and downlink/flexible resources. FIGS. 7-10 provide examples of signaling associated with determination of valid ROs for SBFD resources.

As indicated above, FIG. 6 is provided as an example. Other examples may differ from what is described with regard to FIG. 6.

Figure 7:
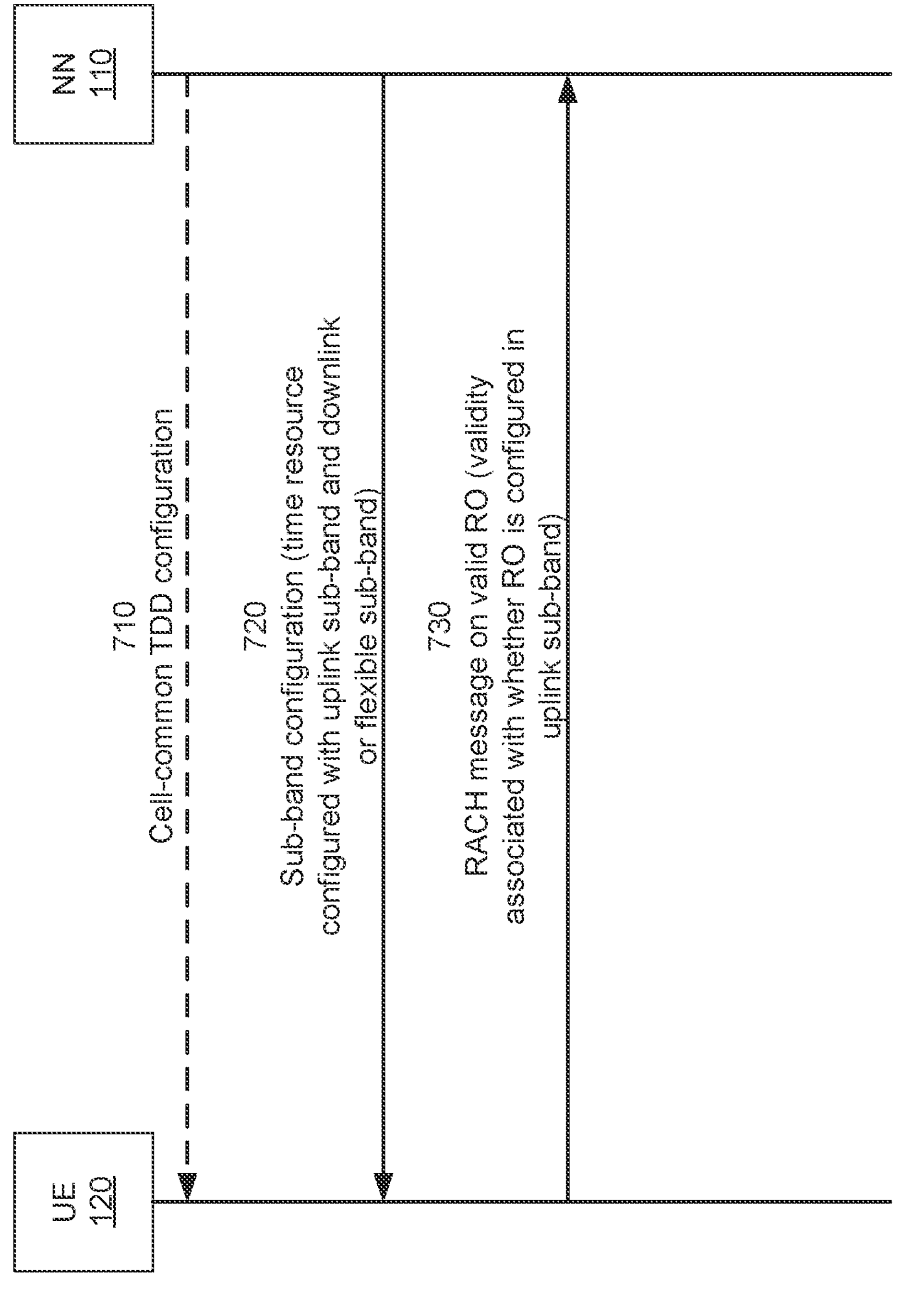
FIG. 7 is a diagram illustrating an example of signaling for valid random access channel (RACH) occasion (RO) determination in SBFD, in accordance with the present disclosure.
Figure 10:
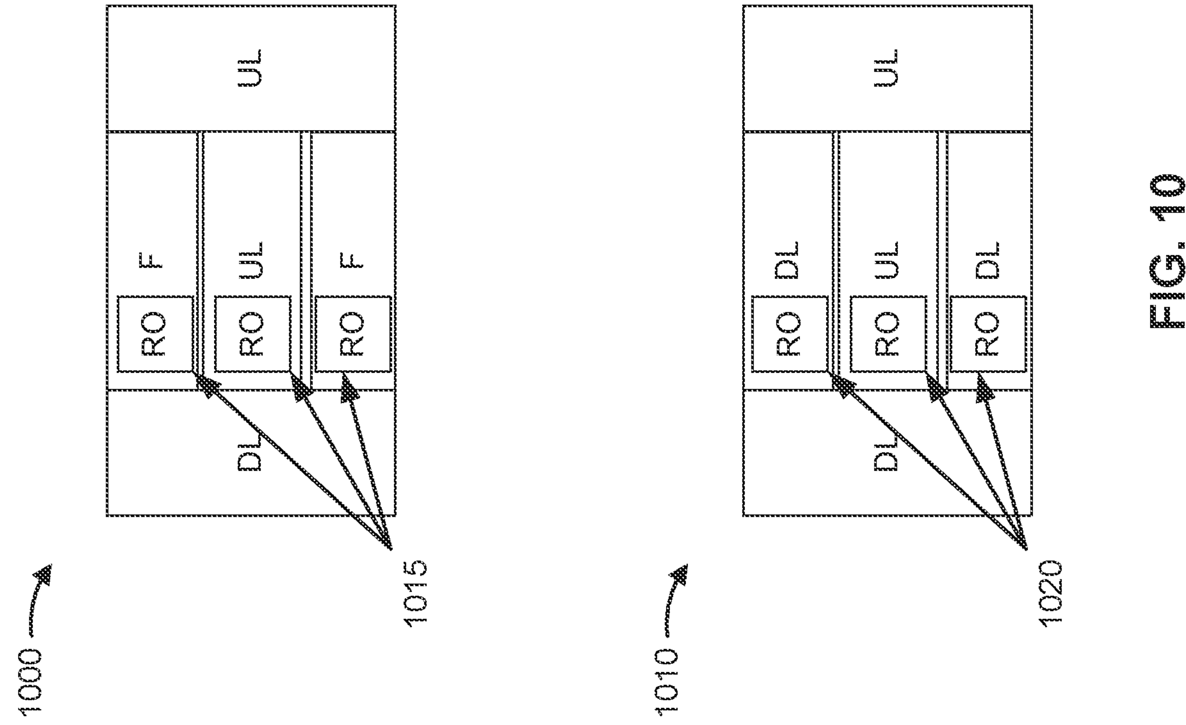

FIG. 7 is a diagram illustrating an example 700 of signaling for valid RO determination in SBFD, in accordance with the present disclosure. Example 700 includes a UE 120 and a network node 110. FIGS. 8-10 illustrate examples 800, 805, 900, 905, 910, 915, 1010 and 1020 of ROs in various configurations of SBFD resource. FIGS. 8-10 are described in connection with FIG. 7. The UE 120 and the network node 110 may communicate in a TDD band (e.g., the cell-common TDD configuration, the sub-band configurations, and/or the RACH occasions may be configured in TDD band), such as unpaired spectrum. Furthermore, the network node 110 may be an SBFD network node 110, meaning that SBFD is implemented at the network node 110.

As shown by reference number 710, in some aspects, the UE 120 may receive, and the network node 110 may transmit, a cell-common TDD configuration (e.g., tdd-UL-DL-ConfigurationCommon). In some other aspects, the UE 120 may not receive the cell-common TDD configuration. Aspects described herein provide valid RO determination for cases where the UE 120 receives the cell-common TDD configuration (illustrated in FIGS. 9 and 10) and for cases where the UE 120 does not receive the cell-common TDD configuration (illustrated in FIG. 8). The cell-common TDD configuration may relate to a set of time resources (which may include the time resource reconfigured by the sub-band configuration).

As shown in FIG. 7, and by reference number 720, the UE 120 may receive, and the network node 110 may transmit, a sub-band configuration. The sub-band configuration is described in more detail in connection with FIG. 4. The sub-band configuration may relate to one or more time resources, such as one or more slots, one or more symbols, or the like. For example, the sub-band configuration may configure the one or more time resources as SBFD resources. An SBFD resource may include an uplink sub-band and at least one of a downlink sub-band or a flexible sub-band.

As shown by reference number 730, the UE 120 may transmit, and the network node 110 may receive, a RACH message (e.g., RACH message 1 or RACH message A, a RACH preamble) on an RO having a valid status. For example, the UE 120 may transmit the RACH message on an RO only if the RO is associated with the valid status (e.g., is a valid RO).

Examples of valid and invalid ROs are provided below, first in the context of a UE 120 that has not received the cell-common TDD configuration (described with regard to FIG. 8), and second in the context of a UE 120 that has received the cell-common TDD configuration shown by reference number 710 (described with regard to FIGS. 9 and 10).

FIG. 8 shows examples 800 and 805 in which the UE 120 has not been provided with a cell-common TDD configuration (e.g., tdd-UL-DL-ConfigurationCommon) shown by reference number 710, and has been provided with a sub-band configuration shown by reference number 720. In example 800, an RO 810 is configured in an uplink sub-band of a time resource. The RO 810 may be associated with the valid status due to the RO being configured in the uplink sub-band. For example, if the UE 120 is not provided with tdd-UL-DL-ConfigurationCommon and is provided with a DL/UL subband configuration (i.e., flexible symbols with uplink sub-band (UL-SB)), a PRACH occasion in a PRACH slot with a configured UL subband is considered valid if the frequency resources of the PRACH are within the UL subband.

In example 805, an RO 815 partially overlaps outside of the uplink sub-band. In some aspects, the RO 815 is not valid if the UE 120 is configured or indicated not to transmit outside the uplink sub-band (e.g., such that the flexible sub-band is treated as a downlink sub-band). For example, if the UE 120 does not receive an indication to transmit outside the uplink sub-band, the RO 815 may be invalid. In some aspects, the RO 815 is valid if the UE is configured or indicated to transmit outside the uplink sub-band (e.g., such that the flexible sub-band is treated as an uplink sub-band).

FIG. 9 shows examples 900 and 905 of an RO in a slot with a flexible sub-band. FIG. 9 also shows examples 910 and 915 of an RO in a slot with a downlink sub-band. In examples 900, 905, 910, and 915, the UE 120 has been provided with a cell-common TDD configuration (e.g., tdd-UL-DL-ConfigurationCommon) shown by reference number 710, and has been provided with a sub-band configuration shown by reference number 720.

In example 900, the time resource includes the uplink sub-band and the flexible sub-band. In example 900, an RO 920 is associated with a valid status when the RO 920 is within the uplink sub-band. For example, if a UE 120 is provided with tdd-UL-DL-ConfigurationCommon and DL/UL subband configuration, a PRACH occasion in a PRACH slot indicated as 'Flexible symbol' with a configured UL subband is considered valid if the frequency resources of the PRACH occasion are within the UL subband.

In example 905, the time resource includes the uplink sub-band and the flexible sub-band. In example 905, an RO 925 partially overlaps outside of the uplink sub-band. In some aspects, the RO 925 is not valid if the UE 120 is configured or indicated not to transmit outside the uplink sub-band (e.g., such that the flexible sub-band is treated as a downlink sub-band). For example, if the UE 120 does not receive an indication to transmit outside the uplink sub-band, the RO 925 may be invalid. In some aspects, the RO 925 is valid if the UE is configured or indicated to transmit outside the uplink sub-band (e.g., such that the flexible sub-band is treated as an uplink sub-band).

In examples 910 and 915, the time resource includes the uplink sub-band and the downlink sub-band. In example 910, an RO 930 is associated with a valid status when the RO 930 is within the uplink sub-band. For example, if the UE 120 is provided with tdd-UL-DL-ConfigurationCommon and DL/UL subband configuration, a PRACH occasion in a PRACH slot indicated as 'Downlink symbol' with a configured UL subband is considered valid if the frequency resources of the PRACH are within the UL subband.

In example 915, an RO 935 partially overlaps outside the uplink sub-band. In some aspects, the RO 935 is invalid (e.g., not associated with a valid status) if the RO partially overlaps outside the uplink sub-band.

In some aspects, if a UE 120 is not provided tdd-UL-DL-ConfigurationCommon (at reference number 710), a PRACH occasion (e.g., RO) in a PRACH slot is valid if the PRACH occasion is configured in an UL subband and the UE 120 is provided with an UL sub-band configuration (such as the sub-band configuration at reference number 720). In some aspects, if a UE is provided tdd-UL-DL-ConfigurationCommon (at reference number 710), a PRACH occasion in a PRACH slot is valid if the PRACH occasion is within UL symbols, or is within an UL subband of the SBFD symbols if the UE is provided with UL subband configuration (such as the sub-band configuration at reference number 720).

FIG. 10 shows examples 1000 and 1010 where multiple ROs are included (e.g., frequency division multiplexed) in one time resource, such as the same set of symbols. This may be due to a configured parameter (e.g., "msg1-FDM") being greater than 1. Furthermore, in examples 1000 and 1010, at least one RO 1015/1020 is outside the uplink sub-band.

In some aspects, if multiple ROs 1015/1020 are included in the same symbols, and one or more ROs 1015/1020 are outside the uplink sub-band, and the UE is not configured or indicated to transmit outside the uplink sub-band, all ROs of the multiple ROs 1015/1020 are associated with the invalid status (e.g., are invalid). In some aspects, if multiple ROs 1015/1020 are included in the same symbols, and one or more ROs 1015/1020 are outside the uplink sub-band, and the UE is not configured or indicated to transmit outside the uplink sub-band, only the one or more ROs 1015/1020 that are outside the uplink sub-band are associated with the invalid status (e.g., are invalid). In some aspects, whether the one or more ROs 1015/1020 outside the uplink sub-band are invalid may depend on an SSB-to-RO mapping, as described elsewhere herein. For example, if a single SSB is mapped to multiple ROs, then it may be appropriate for only ROs outside the uplink sub-band to be invalid, since the UE 120 may have other ROs for the SSB in the same symbols.

As indicated above, FIGS. 7-10 are provided as examples. Other examples may differ from what is described with regard to FIGS. 7-10.

FIG. 11 is a diagram illustrating an example process 1100 performed, for example, at a UE or an apparatus of a UE, in accordance with the present disclosure. Example process 1100 is an example where the apparatus or the UE (e.g., UE 120) performs operations associated with valid random access channel occasions.

As shown in FIG. 11, in some aspects, process 1100 may include receiving a sub-band configuration indicating that a time resource is configured to include an uplink sub-band and at least one of a downlink sub-band or a flexible sub-band (block 1110). For example, the UE (e.g., using reception component 1302 and/or communication manager 1306, depicted in FIG. 13) may receive a sub-band configuration indicating that a time resource is configured to include an uplink sub-band and at least one of a downlink sub-band or a flexible sub-band, as described above.

As further shown in FIG. 11, in some aspects, process 1100 may include transmitting an RACH message on an RO, wherein the RO is associated with a valid status in association with whether the RO is configured in the uplink sub-band (block 1120). For example, the UE (e.g., using transmission component 1304 and/or communication manager 1306, depicted in FIG. 13) may transmit an RACH message on an RO, wherein the RO is associated with a valid status in association with whether the RO is configured in the uplink sub-band, as described above.

Process 1100 may include additional aspects, such as any single aspect or any combination of aspects described below and/or in connection with one or more other processes described elsewhere herein.

In a first aspect, transmitting the RACH message on the RO further comprises transmitting the RACH message on the RO only if the RO is associated with the valid status.

In a second aspect, the time resource includes the uplink sub-band and the flexible sub-band, and wherein the RO is associated with the valid status due to the RO being configured in the uplink sub-band.

In a third aspect, process 1100 includes receiving an indication to transmit outside of the uplink sub-band, wherein the RO at least partially overlaps the flexible sub-band, and wherein the RO is associated with the valid status in association with the indication.

In a fourth aspect, the RO is valid when the UE is configured or indicated to transmit outside the uplink sub-band.

In a fifth aspect, ROs that at least partially overlap the flexible sub-band are not associated with the valid status when the UE is not configured or indicated to transmit outside the uplink sub-band.

In a sixth aspect, receiving the sub-band configuration comprises receiving the sub-band configuration without receiving a cell-common time division duplexing configuration pertaining to the time resource.

In a seventh aspect, process 1100 includes receiving a cell-common time division duplexing configuration pertaining to the time resource, wherein the cell-common time division duplexing configuration or the sub-band configuration indicates that the time resource includes the flexible sub-band, and wherein the RO is associated with the valid status due to the RO occurring in the uplink sub-band.

In an eighth aspect, process 1100 includes receiving an indication to transmit outside of the uplink sub-band, wherein the RO at least partially overlaps the flexible sub-band, and wherein the RO is associated with the valid status in association with the indication.

In a ninth aspect, the RO is valid when the UE is configured or indicated to transmit outside the uplink sub-band.

In a tenth aspect, ROs that at least partially overlap the flexible sub-band are not associated with the valid status when the UE is not configured or indicated to transmit outside the uplink sub-band.

In an eleventh aspect, process 1100 includes receiving a cell-common time division duplexing configuration pertaining to the time resource, wherein the cell-common time division duplexing configuration or the sub-band configuration indicates that the time resource includes the downlink sub-band, and wherein the RO is associated with the valid status due to the RO occurring in the uplink sub-band.

In a twelfth aspect, ROs that at least partially overlap the downlink sub-band are not associated with the valid status.

In a thirteenth aspect, the RO is a first RO configured in the time resource and in the uplink sub-band, wherein a second RO is configured in the time resource and outside of the uplink sub-band, and wherein the second RO is not associated with the valid status.

In a fourteenth aspect, the sub-band configuration indicates another time resource that is configured to include the uplink sub-band and at least one of the downlink sub-band or the flexible sub-band, wherein the other time resource includes a plurality of ROs including a first RO and a second RO, wherein the first RO is configured outside the uplink sub-band, and wherein the plurality of ROs are not associated with the valid status.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, at a network node or an apparatus of a network node, in accordance with the present disclosure. Example process 1200 is an example where the apparatus or the network node (e.g., network node 110) performs operations associated with valid random access channel occasions.

As shown in FIG. 12, in some aspects, process 1200 may include transmitting, to a UE, a sub-band configuration indicating that a time resource is configured to include an uplink sub-band and at least one of a downlink sub-band or a flexible sub-band (block 1210). For example, the network node (e.g., using transmission component 1404 and/or communication manager 1406, depicted in FIG. 14) may transmit, to a UE, a sub-band configuration indicating that a time resource is configured to include an uplink sub-band and at least one of a downlink sub-band or a flexible sub-band, as described above.

As further shown in FIG. 12, in some aspects, process 1200 may include configuring a RO, wherein the RO is associated with a valid status in association with whether the RO is configured in the uplink sub-band (block 1220). For example, the network node (e.g., using communication manager 1406, depicted in FIG. 14) may configure a RO, wherein the RO is associated with a valid status in association with whether the RO is configured in the uplink sub-band, as described above.

Process 1200 may include additional aspects, such as any single aspect or any combination of aspects described below and/or in connection with one or more other processes described elsewhere herein.

In a first aspect, the time resource includes the uplink sub-band and the flexible sub-band, and wherein the RO is associated with the valid status due to the RO being configured in the uplink sub-band.

In a second aspect, process 1200 includes transmitting an indication to transmit outside of the uplink sub-band, wherein the RO at least partially overlaps the flexible sub-band, and wherein the RO is associated with the valid status in association with the indication.

In a third aspect, the RO is valid when the UE is configured or indicated to transmit outside the uplink sub-band.

In a fourth aspect, ROs that at least partially overlap the flexible sub-band are not associated with the valid status when the UE is not configured or indicated to transmit outside the uplink sub-band.

In a fifth aspect, transmitting the sub-band configuration comprises transmitting the sub-band configuration without transmitting a cell-common time division duplexing configuration pertaining to the time resource.

In a sixth aspect, process 1200 includes transmitting a cell-common time division duplexing configuration pertaining to the time resource, wherein the cell-common time division duplexing configuration or the sub-band configuration indicates that the time resource includes the flexible sub-band, and wherein the RO is associated with the valid status due to the RO occurring in the uplink sub-band.

In a seventh aspect, process 1200 includes transmitting an indication to transmit outside of the uplink sub-band, wherein the RO at least partially overlaps the flexible sub-band, and wherein the RO is associated with the valid status in association with the indication.

In an eighth aspect, the RO is valid when the UE is configured or indicated to transmit outside the uplink sub-band.

In a ninth aspect, ROs that at least partially overlap the flexible sub-band are not associated with the valid status when the UE is not configured or indicated to transmit outside the uplink sub-band.

In a tenth aspect, process 1200 includes transmitting a cell-common time division duplexing configuration pertaining to the time resource, wherein the cell-common time division duplexing configuration or the sub-band configuration indicates that the time resource includes the downlink sub-band, and wherein the RO is associated with the valid status due to the RO occurring in the uplink sub-band.

In an eleventh aspect, ROs that at least partially overlap the downlink sub-band are not associated with the valid status.

In a twelfth aspect, the RO is a first RO configured in the time resource and in the uplink sub-band, wherein a second RO is configured in the time resource and outside of the uplink sub-band, and wherein the second RO is not associated with the valid status.

In a thirteenth aspect, the sub-band configuration indicates another time resource that is configured to include the uplink sub-band and at least one of the downlink sub-band or the flexible sub-band, wherein the other time resource includes a plurality of ROs including a first RO and a second RO, wherein the first RO is configured outside the uplink sub-band, and wherein the plurality of ROs are not associated with the valid status.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
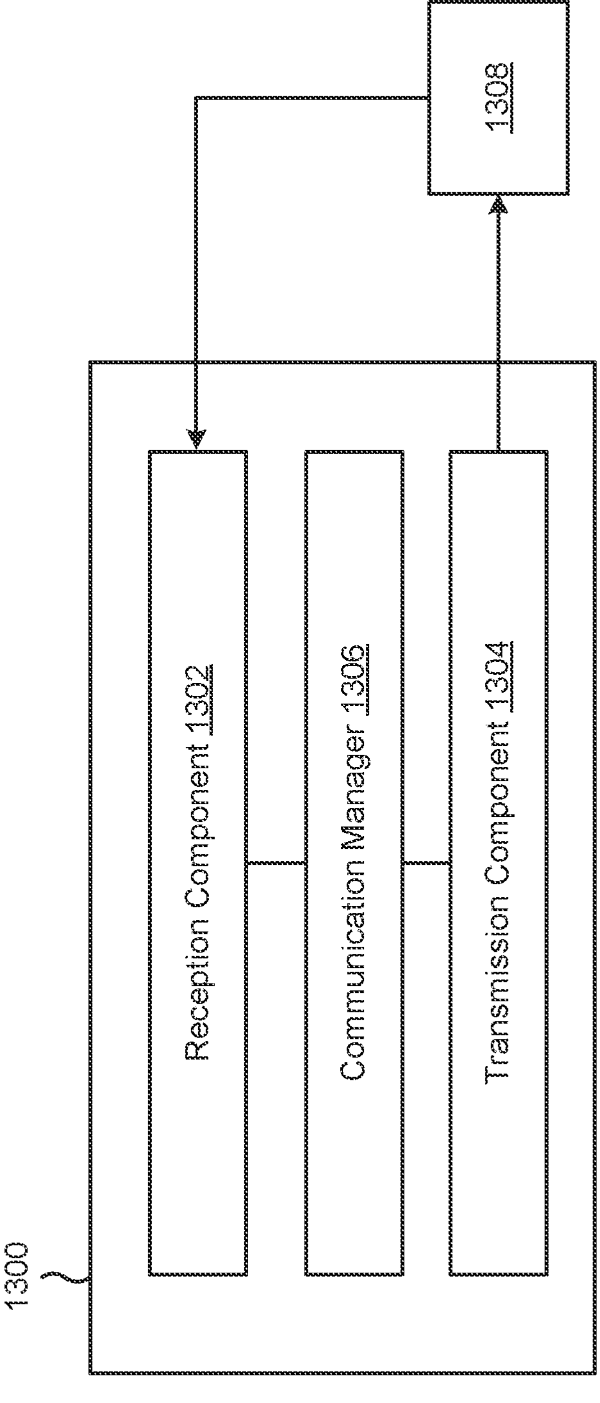
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 140 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 4-10. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1304 may be co-located with the reception component 1302 in one or more transceivers.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The reception component 1302 may receive a sub-band configuration indicating that a time resource is configured to include an uplink sub-band and at least one of a downlink sub-band or a flexible sub-band. The transmission component 1304 may transmit an RACH message on an RO, wherein the RO is associated with a valid status in association with whether the RO is configured in the uplink sub-band.

The reception component 1302 may receive an indication to transmit outside of the uplink sub-band, wherein the RO at least partially overlaps the flexible sub-band, and wherein the RO is associated with the valid status in association with the indication.

The reception component 1302 may receive a cell-common time division duplexing configuration pertaining to the time resource, wherein the cell-common time division duplexing configuration or the sub-band configuration indicates that the time resource includes the flexible sub-band, and wherein the RO is associated with the valid status due to the RO occurring in the uplink sub-band.

The reception component 1302 may receive an indication to transmit outside of the uplink sub-band, wherein the RO at least partially overlaps the flexible sub-band, and wherein the RO is associated with the valid status in association with the indication.

The reception component 1302 may receive a cell-common time division duplexing configuration pertaining to the time resource, wherein the cell-common time division duplexing configuration or the sub-band configuration indicates that the time resource includes the downlink sub-band, and wherein the RO is associated with the valid status due to the RO occurring in the uplink sub-band.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
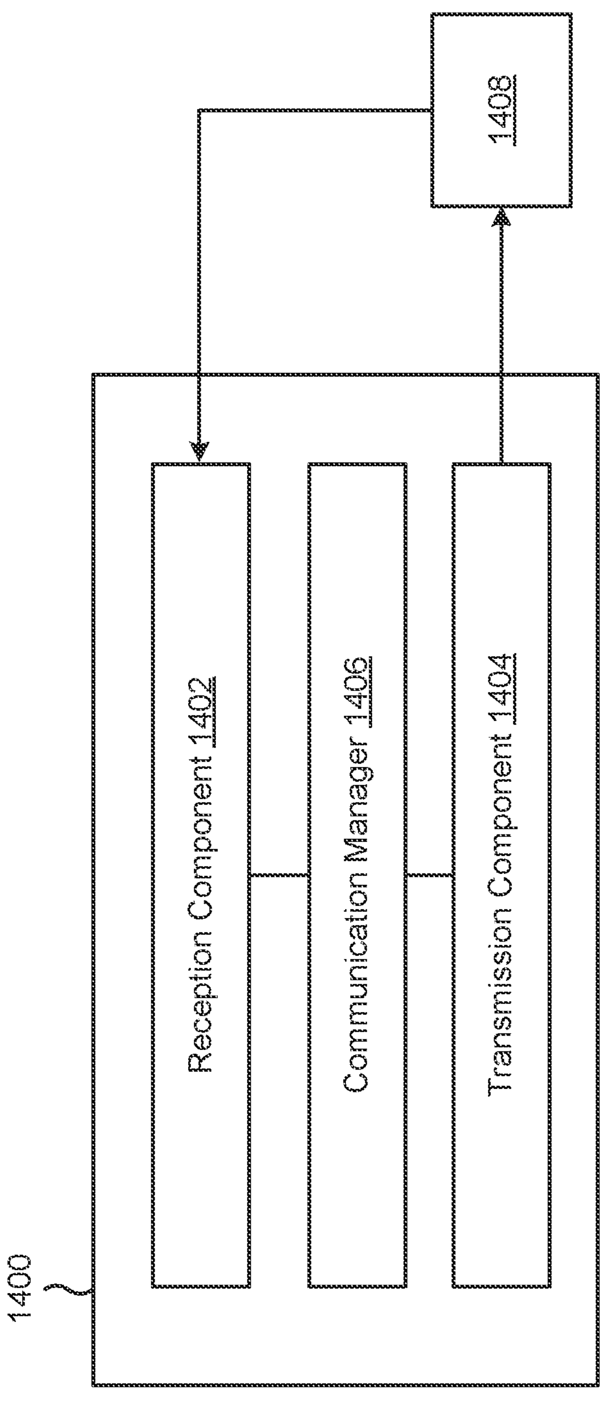
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a network node, or a network node may include the apparatus 1400. In some aspects, the apparatus 1400 includes a reception component 1402, a transmission component 1404, and/or a communication manager 1406, which may be in communication with one another (for example, via one or more buses and/or one or more other components). In some aspects, the communication manager 1406 is the communication manager 150 described in connection with FIG. 1. As shown, the apparatus 1400 may communicate with another apparatus 1408, such as a UE or a network node (such as a CU, a DU, an RU, or a base station), using the reception component 1402 and the transmission component 1404.

In some aspects, the apparatus 1400 may be configured to perform one or more operations described herein in connection with FIGS. 4-10. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1402 and/or the transmission component 1404 may include or may be included in a network interface. The network interface may be configured to obtain and/or output signals for the apparatus 1400 via one or more communications links, such as a backhaul link, a midhaul link, and/or a fronthaul link.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1404 may be co-located with the reception component 1402 in one or more transceivers.

The communication manager 1406 may support operations of the reception component 1402 and/or the transmission component 1404. For example, the communication manager 1406 may receive information associated with configuring reception of communications by the reception component 1402 and/or transmission of communications by the transmission component 1404. Additionally, or alternatively, the communication manager 1406 may generate and/or provide control information to the reception component 1402 and/or the transmission component 1404 to control reception and/or transmission of communications.

The transmission component 1404 may transmit, to a UE, a sub-band configuration indicating that a time resource is configured to include an uplink sub-band and at least one of a downlink sub-band or a flexible sub-band. The communication manager 1406 may configure a RO, wherein the RO is associated with a valid status in association with whether the RO is configured in the uplink sub-band.

The transmission component 1404 may transmit an indication to transmit outside of the uplink sub-band, wherein the RO at least partially overlaps the flexible sub-band, and wherein the RO is associated with the valid status in association with the indication.

The transmission component 1404 may transmit a cell-common time division duplexing configuration pertaining to the time resource, wherein the cell-common time division duplexing configuration or the sub-band configuration indicates that the time resource includes the flexible sub-band, and wherein the RO is associated with the valid status due to the RO occurring in the uplink sub-band.

The transmission component 1404 may transmit a cell-common time division duplexing configuration pertaining to the time resource, wherein the cell-common time division duplexing configuration or the sub-band configuration indicates that the time resource includes the downlink sub-band, and wherein the RO is associated with the valid status due to the RO occurring in the uplink sub-band.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving a sub-band configuration indicating that a time resource is configured to include an uplink sub-band and at least one of a downlink sub-band or a flexible sub-band; and transmitting a random access channel (RACH) message on a RACH occasion (RO), wherein the RO is associated with a valid status in association with whether the RO is configured in the uplink sub-band.

Aspect 2: The method of Aspect 1, wherein transmitting the RACH message on the RO further comprises transmitting the RACH message on the RO only if the RO is associated with the valid status.

Aspect 3: The method of any of Aspects 1-2, wherein the time resource includes the uplink sub-band and the flexible sub-band, and wherein the RO is associated with the valid status due to the RO being configured in the uplink sub-band.

Aspect 4: The method of any of Aspects 1-3, further comprising receiving an indication to transmit outside of the uplink sub-band, wherein the RO at least partially overlaps the flexible sub-band, and wherein the RO is associated with the valid status in association with the indication.

Aspect 5: The method of Aspect 4, wherein the RO is valid when the UE is configured or indicated to transmit outside the uplink sub-band.

Aspect 6: The method of any of Aspects 1-5, wherein ROs that at least partially overlap the flexible sub-band are not associated with the valid status when the UE is not configured or indicated to transmit outside the uplink sub-band.

Aspect 7: The method of any of Aspects 1-6, wherein receiving the sub-band configuration comprises receiving the sub-band configuration without receiving a cell-common time division duplexing configuration pertaining to the time resource.

Aspect 8: The method of any of Aspects 1-7, further comprising receiving a cell-common time division duplexing configuration pertaining to the time resource, wherein the cell-common time division duplexing configuration or the sub-band configuration indicates that the time resource includes the flexible sub-band, and wherein the RO is associated with the valid status due to the RO occurring in the uplink sub-band.

Aspect 9: The method of Aspect 8, further comprising receiving an indication to transmit outside of the uplink sub-band, wherein the RO at least partially overlaps the flexible sub-band, and wherein the RO is associated with the valid status in association with the indication.

Aspect 10: The method of Aspect 9, wherein the RO is valid when the UE is configured or indicated to transmit outside the uplink sub-band.

Aspect 11: The method of Aspect 8, wherein ROs that at least partially overlap the flexible sub-band are not associated with the valid status when the UE is not configured or indicated to transmit outside the uplink sub-band.

Aspect 12: The method of any of Aspects 1-11, further comprising receiving a cell-common time division duplexing configuration pertaining to the time resource, wherein the cell-common time division duplexing configuration or the sub-band configuration indicates that the time resource includes the downlink sub-band, and wherein the RO is associated with the valid status due to the RO occurring in the uplink sub-band.

Aspect 13: The method of Aspect 12, wherein ROs that at least partially overlap the downlink sub-band are not associated with the valid status.

Aspect 14: The method of any of Aspects 1-13, wherein the RO is a first RO configured in the time resource and in the uplink sub-band, wherein a second RO is configured in the time resource and outside of the uplink sub-band, and wherein the second RO is not associated with the valid status.

Aspect 15: The method of any of Aspects 1-14, wherein the sub-band configuration indicates another time resource that is configured to include the uplink sub-band and at least one of the downlink sub-band or the flexible sub-band, wherein the other time resource includes a plurality of ROs including a first RO and a second RO, wherein the first RO is configured outside the uplink sub-band, and wherein the plurality of ROs are not associated with the valid status.

Aspect 16: A method of wireless communication performed by a network node, comprising: transmitting, to a user equipment (UE), a sub-band configuration indicating that a time resource is configured to include an uplink sub-band and at least one of a downlink sub-band or a flexible sub-band; and configuring a RACH occasion (RO), wherein the RO is associated with a valid status in association with whether the RO is configured in the uplink sub-band.

Aspect 17: The method of Aspect 16, wherein the time resource includes the uplink sub-band and the flexible sub-band, and wherein the RO is associated with the valid status due to the RO being configured in the uplink sub-band.

Aspect 18: The method of any of Aspects 16-17, further comprising transmitting an indication to transmit outside of the uplink sub-band, wherein the RO at least partially overlaps the flexible sub-band, and wherein the RO is associated with the valid status in association with the indication.

Aspect 19: The method of Aspect 18, wherein the RO is valid when the UE is configured or indicated to transmit outside the uplink sub-band.

Aspect 20: The method of any of Aspects 16-19, wherein ROs that at least partially overlap the flexible sub-band are not associated with the valid status when the UE is not configured or indicated to transmit outside the uplink sub-band.

Aspect 21: The method of any of Aspects 16-20, wherein transmitting the sub-band configuration comprises transmitting the sub-band configuration without transmitting a cell-common time division duplexing configuration pertaining to the time resource.

Aspect 22: The method of any of Aspects 16-21, further comprising transmitting a cell-common time division duplexing configuration pertaining to the time resource, wherein the cell-common time division duplexing configuration or the sub-band configuration indicates that the time resource includes the flexible sub-band, and wherein the RO is associated with the valid status due to the RO occurring in the uplink sub-band.

Aspect 23: The method of Aspect 22, further comprising transmitting an indication to transmit outside of the uplink sub-band, wherein the RO at least partially overlaps the flexible sub-band, and wherein the RO is associated with the valid status in association with the indication.

Aspect 24: The method of Aspect 23, wherein the RO is valid when the UE is configured or indicated to transmit outside the uplink sub-band.

Aspect 25: The method of Aspect 23, wherein ROs that at least partially overlap the flexible sub-band are not associated with the valid status when the UE is not configured or indicated to transmit outside the uplink sub-band.

Aspect 26: The method of any of Aspects 16-25, further comprising transmitting a cell-common time division duplexing configuration pertaining to the time resource, wherein the cell-common time division duplexing configuration or the sub-band configuration indicates that the time resource includes the downlink sub-band, and wherein the RO is associated with the valid status due to the RO occurring in the uplink sub-band.

Aspect 27: The method of Aspect 26, wherein ROs that at least partially overlap the downlink sub-band are not associated with the valid status.

Aspect 28: The method of any of Aspects 16-27, wherein the RO is a first RO configured in the time resource and in the uplink sub-band, wherein a second RO is configured in the time resource and outside of the uplink sub-band, and wherein the second RO is not associated with the valid status.

Aspect 29: The method of any of Aspects 16-28, wherein the sub-band configuration indicates another time resource that is configured to include the uplink sub-band and at least one of the downlink sub-band or the flexible sub-band, wherein the other time resource includes a plurality of ROs including a first RO and a second RO, wherein the first RO is configured outside the uplink sub-band, and wherein the plurality of ROs are not associated with the valid status.

Aspect 30: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-29.

Aspect 31: An apparatus for wireless communication at a device, the apparatus comprising one or more memories and one or more processors coupled to the one or more memories, the one or more processors configured to cause the device to perform the method of one or more of Aspects 1-29.

Aspect 32: An apparatus for wireless communication, the apparatus comprising at least one means for performing the method of one or more of Aspects 1-29.

Aspect 33: A non-transitory computer-readable medium storing code for wireless communication, the code comprising instructions executable by one or more processors to perform the method of one or more of Aspects 1-29.

Aspect 34: A non-transitory computer-readable medium storing a set of instructions for wireless communication, the set of instructions comprising one or more instructions that, when executed by one or more processors of a device, cause the device to perform the method of one or more of Aspects 1-29.

Aspect 35: A device for wireless communication, the device comprising a processing system that includes one or more processors and one or more memories coupled with the one or more processors, the processing system configured to cause the device to perform the method of one or more of Aspects 1-29.

Aspect 36: An apparatus for wireless communication at a device, the apparatus comprising one or more memories and one or more processors coupled to the one or more memories, the one or more processors individually or collectively configured to cause the device to perform the method of one or more of Aspects 1-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a user equipment (UE), comprising:

one or more memories; and one or more processors, coupled to the one or more memories, configured to cause the UE to:

receive a sub-band configuration indicating that a time resource is configured to include an uplink sub-band and at least one of a downlink sub-band or a flexible sub-band;

receive an indication to transmit outside of the uplink sub-band; and transmit a random access channel (RACH) message on a RACH occasion (RO), wherein the RO at least partially overlaps the flexible sub-band, and wherein the RO is associated with a valid status in association with whether the RO is configured in the uplink sub-band and in association with the indication.

2. The apparatus of claim 1, wherein the one or more processors, to cause the UE to transmit the RACH message on the RO, are configured to cause the UE to transmit the RACH message on the RO only if the RO is associated with the valid status.

3. The apparatus of claim 1, wherein the time resource includes the uplink sub-band and the flexible sub-band, and wherein the RO is associated with the valid status due to the RO being configured in the uplink sub-band.

4. The apparatus of claim 1, wherein the RO is valid when the UE is configured or indicated to transmit outside the uplink sub-band.

5. The apparatus of claim 1, wherein ROs that at least partially overlap the flexible sub-band are not associated with the valid in an absence of the indication to transmit outside the uplink sub-band.

6. The apparatus of claim 1, wherein the one or more processors, to cause the UE to receive the sub-band configuration, are configured to cause the UE to receive the sub-band configuration without receiving a cell-common time division duplexing configuration pertaining to the time resource.

7. The apparatus of claim 1, wherein the one or more processors are further configured to cause the UE to receive a cell-common time division duplexing configuration pertaining to the time resource, wherein the cell-common time division duplexing configuration or the sub-band configuration indicates that the time resource includes the flexible sub-band, and wherein the RO is associated with the valid status due to the RO occurring in the uplink sub-band.

8. The apparatus of claim 7, wherein the one or more processors are further configured to cause the UE to receive an indication to transmit outside of the uplink sub-band, wherein the RO at least partially overlaps the flexible sub-band, and wherein the RO is associated with the valid status in association with the indication.

9. The apparatus of claim 8, wherein the RO is valid when the UE is configured or indicated to transmit outside the uplink sub-band.

10. The apparatus of claim 7, wherein ROs that at least partially overlap the flexible sub-band are not associated with the valid status when the UE is not configured or indicated to transmit outside the uplink sub-band.

11. The apparatus of claim 1, wherein the one or more processors are further configured to cause the UE to receive a cell-common time division duplexing configuration pertaining to the time resource, wherein the cell-common time division duplexing configuration or the sub-band configuration indicates that the time resource includes the downlink sub-band, and wherein the RO is associated with the valid status due to the RO occurring in the uplink sub-band.

12. The apparatus of claim 11, wherein ROs that at least partially overlap the downlink sub-band are not associated with the valid status.

13. The apparatus of claim 1, wherein the RO is a first RO configured in the time resource and in the uplink sub-band, wherein a second RO is configured in the time resource and outside of the uplink sub-band, and wherein the second RO is not associated with the valid status.

14. The apparatus of claim 1, wherein the sub-band configuration indicates another time resource that is configured to include the uplink sub-band and at least one of the downlink sub-band or the flexible sub-band, wherein the other time resource includes a plurality of ROs including a first RO and a second RO, wherein the first RO is configured outside the uplink sub-band, and wherein the plurality of ROs are not associated with the valid status.

15. An apparatus for wireless communication at a network node, comprising:

one or more memories; and one or more processors, coupled to the one or more memories, configured to cause the network node to:

transmit, to a user equipment (UE), a sub-band configuration indicating that a time resource is configured to include an uplink sub-band and at least one of a downlink sub-band or a flexible sub-band;

transmit, to the UE, an indication to transmit outside of the uplink sub-band; and configure a random access channel (RACH) occasion (RO), wherein the RO at least partially overlaps the flexible sub-band, and wherein the RO is associated with a valid status in association with whether the RO is configured in the uplink sub-band and in association with the indication.

16. The apparatus of claim 15, wherein the time resource includes the uplink sub-band and the flexible sub-band, and wherein the RO is associated with the valid status due to the RO being configured in the uplink sub-band.

17. The apparatus of claim 15, wherein the one or more processors are further configured to cause the network node to transmit an indication to transmit outside of the uplink sub-band, wherein the RO at least partially overlaps the flexible sub-band, and wherein the RO is associated with the valid status in association with the indication.

18. The apparatus of claim 17, wherein the RO is valid when the UE is configured or indicated to transmit outside the uplink sub-band.

19. The apparatus of claim 15, wherein ROs that at least partially overlap the flexible sub-band are not associated with the valid status when the UE is not configured or indicated to transmit outside the uplink sub-band.

20. The apparatus of claim 15, wherein the one or more processors, to cause the network node to transmit the sub-band configuration, are configured to cause the network node to transmit the sub-band configuration without transmitting a cell-common time division duplexing configuration pertaining to the time resource.

21. The apparatus of claim 15, wherein the one or more processors are further configured to cause the network node to transmit a cell-common time division duplexing configuration pertaining to the time resource, wherein the cell-common time division duplexing configuration or the sub-band configuration indicates that the time resource includes the flexible sub-band, and wherein the RO is associated with the valid status due to the RO occurring in the uplink sub-band.

22. The apparatus of claim 21, wherein the one or more processors are further configured to cause the network node to transmit an indication to transmit outside of the uplink sub-band, wherein the RO at least partially overlaps the flexible sub-band, and wherein the RO is associated with the valid status in association with the indication.

23. The apparatus of claim 22, wherein the RO is valid when the UE is configured or indicated to transmit outside the uplink sub-band.

24. The apparatus of claim 22, wherein ROs that at least partially overlap the flexible sub-band are not associated with the valid status when the UE is not configured or indicated to transmit outside the uplink sub-band.

25. The apparatus of claim 15, wherein the one or more processors are further configured to cause the network node to transmit a cell-common time division duplexing configuration pertaining to the time resource, wherein the cell-common time division duplexing configuration or the sub-band configuration indicates that the time resource includes the downlink sub-band, and wherein the RO is associated with the valid status due to the RO occurring in the uplink sub-band.

26. The apparatus of claim 25, wherein ROs that at least partially overlap the downlink sub-band are not associated with the valid status.

27. The apparatus of claim 15, wherein the RO is a first RO configured in the time resource and in the uplink sub-band, wherein a second RO is configured in the time resource and outside of the uplink sub-band, and wherein the second RO is not associated with the valid status.

28. A method of wireless communication performed by a user equipment (UE), comprising:

receiving a sub-band configuration indicating that a time resource is configured to include an uplink sub-band and at least one of a downlink sub-band or a flexible sub-band;

receiving an indication to transmit outside of the uplink sub-band; and transmitting a random access channel (RACH) message on a RACH occasion (RO), wherein the RO at least partially overlaps the flexible sub-band, and wherein the RO is associated with a valid status in association with whether the RO is configured in the uplink sub-band and in association with the indication.

29. A method of wireless communication performed by a network node, comprising:

transmitting, to a user equipment (UE), a sub-band configuration indicating that a time resource is configured to include an uplink sub-band and at least one of a downlink sub-band or a flexible sub-band;

transmitting, to the UE, an indication to transmit outside of the uplink sub-band; and configuring a random access channel (RACH) occasion (RO), wherein the RO at least partially overlaps the flexible sub-band, and wherein the RO is associated with a valid status in association with whether the RO is configured in the uplink sub-band and in association with the indication.

30. The method of claim 28, wherein the method further comprises at least one of:

receiving the sub-band configuration without receiving a cell-common time division duplexing configuration pertaining to the time resource; or receiving a cell-common time division duplexing configuration pertaining to the time resource, wherein the cell-common time division duplexing configuration or the sub-band configuration indicates that the time resource includes at least one of a flexible sub-band or a downlink sub-band, and wherein the RACH occasion (RO) is associated with the valid status due to the RO being configured in the uplink sub-band.

* * * * *